Oct. 13, 1959     J. P. RUTH     2,908,596
CONTINUOUS SUB-ATMOSPHERIC DIFFUSION OF SUGAR
Filed May 7, 1956
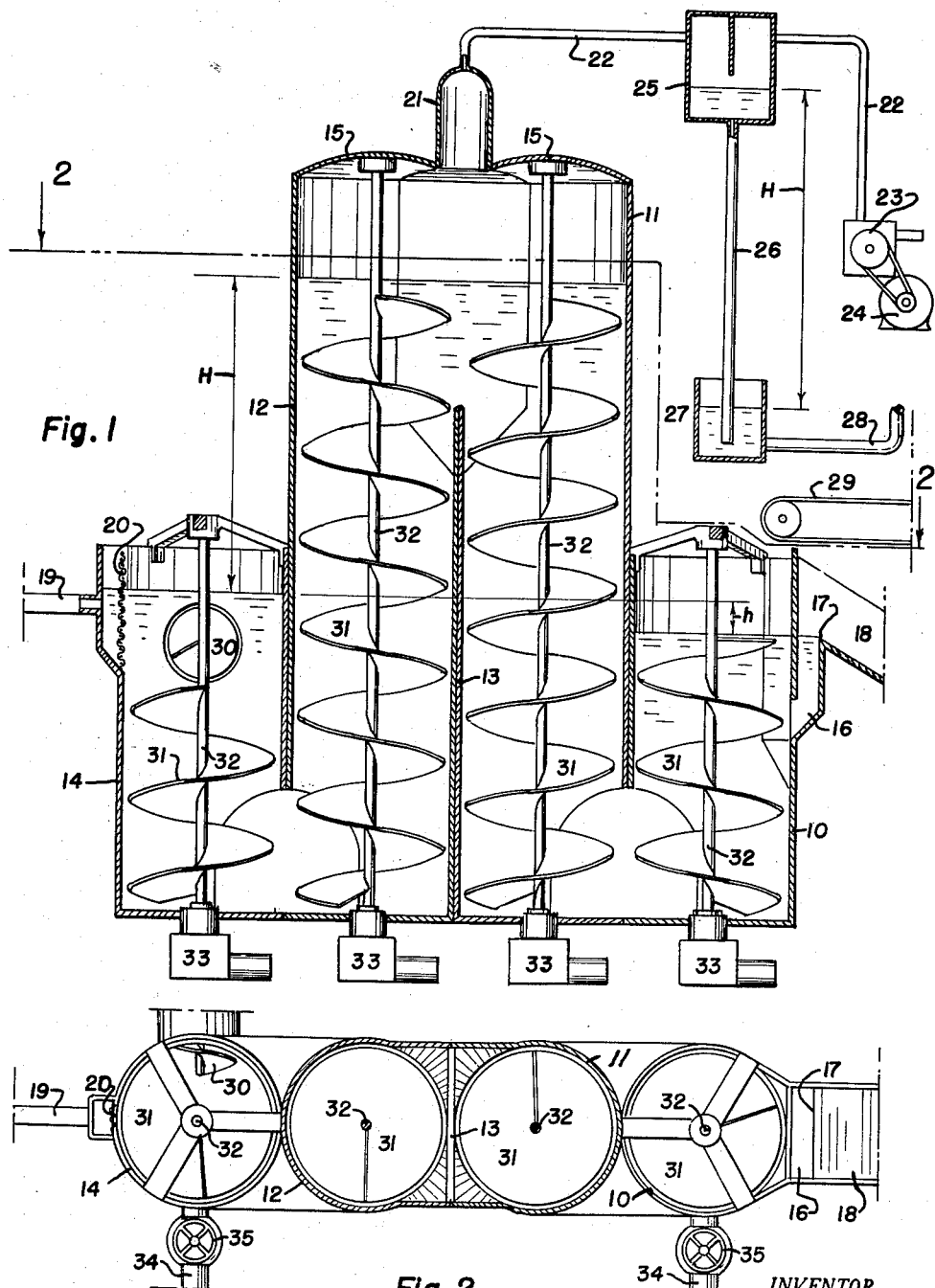
INVENTOR.
Joseph P. Ruth
BY
ATTORNEY

United States Patent Office 2,908,596
Patented Oct. 13, 1959

2,908,596
CONTINUOUS SUB-ATMOSPHERIC DIFFUSION OF SUGAR

Joseph P. Ruth, Denver, Colo.

Application May 7, 1956, Serial No. 583,086

5 Claims. (Cl. 127—45)

This invention relates to the art and practice of extracting sugar from sugar-bearing material, such as sugar beets, through leaching of the material in water in the manner and to an ultimate effect broadly characterizing conventional diffusion processes, and has as an object to provide novel techniques and apparatus efficiently applicable to enhance the recoveries attainable through such processes.

A further object of the invention is to provide novel techniques and correlated operations constituting a sugar diffusion method of continuous, as distinguished from batch, type and high extractive efficiency.

A further object of the invention is to provide a novel and improved method for the continuous diffusion of sugar that is characterized by suppression of adverse bacterial propagation and activity.

A further object of the invention is to provide a novel and improved method for the continuous diffusion of sugar that is distinguished by concomitant deaeration and deoxygenation of solution with consequent promotion of extractive efficiency.

A further object of the invention is to provide a novel and improved method for the continuous diffusion of sugar that includes circulation of the solution through a zone of sub-atmospheric pressure as an incident of the leaching operation.

A further object of the invention is to provide novel and improved apparatus for the continuous diffusion of sugar with facility, economy, and enhanced recovery.

A further object of the invention is to provide novel and improved apparatus effective to deaerate and to deoxygenate solution as an incident of its circulation in a continuous sugar diffusing operation.

A further object of the invention is to provide novel and improved apparatus for the continuous diffusion of sugar that is relatively simple and inexpensive of construction, operation, and maintenance in a wide range of particular sizes and capacities and that is distinguished in use by enhanced recovery of a high quality product.

With the foregoing and other objects in view, my invention consists in the nature and sequential relation of steps constituting a novel method, and in the construction, arrangement, and operative combination of elements comprising apparatus for the practice of such method, as hereinafter set forth, pointed out in my claims, and illustrated by the accompanying drawing, in which—

Figure 1 is a somewhat diagrammatic section vertically and substantially medially through the length of a sugar diffusing unit typically exemplifying the principles and operable for practice of the method distinguishing the invention.

Figure 2 is a transverse section through the apparatus according to the preceding view taken substantially on the indicated line 2—2 thereof.

Continuous, countercurrent circulation of sugar beet cossettes within and through a flow of water and separation of enriched solution from the material at the zone of material input to the water is known to be an efficient technique in the art of sugar diffusion. Further, it is known that conventional heating of water utilized for the diffusion of sugar may be economically facilitated and that the propagation and activity of bacteria normally and adversely present in such operations may be materially suppressed with advantage as to quality, concentration, and amount of sugar content recovery through deaeration and deoxygenation of the diffusing solution, hence the instant invention is directed to an improved method, and to novel apparatus particularly appropriate for the practice of such method, characterized by continuous, countercurrent translation and agitation of cossettes through a solution subject to continuous deaeration and deoxygenation while in contact with the cossettes.

In an extension and improvement of hitherto-known methods applicable to the diffusion of sugar, the method of the instant invention is characterized by maintenance of a flow of water through and to a constant-level outflow from a body thereof, introducing the material to be leached to the water body adjacent such outflow, agitatively translating the material through the water body in countercurrent relation with the flow thereof and to separation from the water body adjacent the water input, and is distinguished by circulation of the counterflowing water and material through the influence of sub-atmospheric pressures effective to exhaust therefrom entrained vapors and uncombined oxygen without impedition of steady countercurrent circulation or loss of solution.

Representative of apparatus susceptible of expedient production and efficient operation for practice of the novel and improved method, a tank adapted to contain liquid is shown as comprised from an open-top, cylindrical well 10 disposed with its axis vertical adjacent and in communication at its lower end with an axially-parallel cylindrical tower 11 of a height greater than, and perhaps double or more, that of said well, a duplicate tower 12 adjacent and parallel to the tower 11 communicating therewith in its upper portion over the upper end of a common wall 13, and a second well 14, similar to or identical with the well 10 terminating the assembly in adjacent, parallel relation with said duplicate tower 12 at the side thereof remote from the well 10 and in communication therewith at its lower end. The wells 10 and 14 and the towers 11 and 12 are preferably associated with their axes in a common vertical plane and with their lower end closures coplanar, thus to dispose the towers in like extension above and between the open tops of the wells, as indicated in Figure 1. Passages are provided through the juxtaposed walls of the well 10 and tower 11, and well 14 and tower 12, along the end closures thereof in a flow capacity substantially equalling that of the tank elements thereby interconnected, upper ends of the towers 11 and 12 are covered, as by means of a closure 15, and the wall 13 common to said towers terminates well below said closure to establish a large capacity area of intercommunication between upper end portions of the towers, thus to provide a continuous, sinuous path for the unrestricted circulation of solutions and materials through the apparatus in both directions between the open upper ends of the wells 10 and 14.

Subjacent the upper end of the well 10, a trap 16 cooperating with a weir 17 at the high point of a launder 18, or equivalent outflow channel, functions in an obvious manner to determine a maximum liquid level in the well 10, and an inflow line 19 leading from any suitable source or supply of water delivers, preferably through a screen 20, to and adjacent the upper end of the well 14 for continuous, regulable infeed of water to the apparatus. Communicating through the closure 15, as by means of a bell or enlargement 21, with the interior upper end space common to the towers 11 and 12, a suction line 22 connected to the intake of an appropriate pump 23, powered as at 24, leads through a baffled compartment 25 arranged to collect moisture and condensate thereby diverted from the flow through said line, and a tubular conduit 26 vertically and operatively between said compartment 25 and an open-top reservoir 27 therebelow served by an outflow line 28 confines a column of liquid subject to the atmospheric pressure acting upon the exposed surface of liquid present in the reservoir. Thus, with an adequate supply of water present in the wells and towers of the apparatus, the pump 23 operating, and liquid present in the reservoir 27, conduit 26, and compartment 25, the sub-atmospheric pressures consequently developed within the upper end space of the towers are reflected by a proportional rise of water within the towers beyond the upper end of the common wall 13 therebetween and to an ultimate height above the water surface exposed in the opentop wells 10 and 14 sufficient to balance the pressure differential occasioned by the pump 23 and equal to the head H of the liquid column typified by the conduit 26. With the pump 23 operating and the apparatus charged with water to the pressure balance above discussed, input of water through the line 19 is productive of a circulation of water downwardly within the well 14, upwardly through the tower 12, across the top of the wall 13, downwardly within the tower 11, and upwardly of the well 10 to outflow through the trap 16 and over the weir 17, with consequent maintenance of correlated liquid levels in the wells and towers and a rate of outflow over the weir equal to that of the regulable input through the line 19. Suction applied through the line 22 operates to exhaust air and vapors from the interior upper end space of the towers 11 and 12 and to consequently deoxygenate and deaerate the water circulating over the upper end of the wall 13 as above described, and while the bell or enlargement 21 minimizes somewhat the amount of water vapor removed from the apparatus through the line, the water vapor so entrained is sufficient when condensed at the compartment 25 to supply and maintain the liquid column typified by the conduit 26 and to promote outflow through the line 28 which may be combined with the outflow through the launder 18, returned to recirculation through the apparatus, or otherwise processed.

The sugar beet cossettes, or other material, to be leached is charged into the apparatus through the open top of the well 10, as by means of a conveyor 29, or the equivalent, whereby to establish a zone of maximum sugar concentration in the solution adjacent the solution outflow, and said material is removed from the apparatus after translation therethrough in countercurrent relation to the solution circulation at the zone of water infeed to the upper portion of the well 14, as by means of an auger conveyor 30, or the equivalent, operable in a usual manner. Translation of the material to be leached through the wells and towers of the apparatus is expediently effected by means of spiral flight, or auger, conveyors 31 fixedly about and rotatable with coaxial stems 32, one such conveyor being coaxially and rotatably associated with and to longitudinally traverse each of the wells 10 and 14, and each of the towers 11 and 12, in any practical manner. The conveyor 31 associated with the well 10 is pitched and rotated to depress material incharged to the well and to deliver such material to the influence of the next adjacent conveyor which is pitched and rotated to elevate the material through the tower 11, whence the material passes over the wall 13 and into the influence of the conveyor of the tower 12 which is pitched and rotated to translate the material to the foot of the tower where it is received by the conveyor of the well 14 and thereby elevated into position for removal from the apparatus by the auger conveyor 30. Any means suitable for the purpose may be provided to effect rotation of the conveyor stems 32, either simultaneously, independently, synchronously, or at varying or variable speeds, and any preferred such drive means is typified by the independently-powered drives 33 shown in Figure 1 as separately associated with the several stems.

With the conveyors 31 at rest while solution circulates through the apparatus in reaction to input from the line 19 and operation of the pump 23, the liquid charge will stand at substantially uniform level in the wells 10 and 14, but with the conveyors operating to translate material through the apparatus in countercurrent relation to the liquid circulation there is a natural consequent elevation of the level within the well 14 above that of the well 10, as represented at $h$ in Figure 1.

Accommodating removal of charge from the apparatus, drain lines 34 regulable by means of valves 35 are provided in any desired association with the elements of the assembly, one such line leading from the base of each of the wells 10 and 14 typifying a practical drain arrangement.

As will be manifest, the apparatus shown and described is effective to establish and maintain countercurrent circulation of solution and material subject to leaching therein, to effect removal of enriched solution at its zone of maximum sugar content concentration adjacent the input of material, to effect removal of leached material at the zone of minimum sugar content concentration of the solution and adjacent the water input, and to subject the solution and material to sub-atmospheric pressures for advantageous deoxygenation and deaeration as an incidence of and without any retarding effect upon their continuous countercurrent travel, thus applying and giving practical effect to the novel and improved method of sugar diffusion.

Since changes, variations, and modification in the form, construction, and arrangement of the apparatus, and in the particularity of method steps and relationships, may be had without departing from the spirit of my invention, I wish to be understood as being limited solely by the scope of the appended claims, rather than by any details of the illustrative showing and foregoing description.

I claim as my invention:

1. The method of sugar diffusion which consists of maintaining a continuous, unidirectional, gravity-induced flow of water through an elevated closed gaseous region of maintained sub-atmospheric pressures above and in contact with the flow between a regulable water inlet and a constant-level water outflow both open to atmosphere, continuously feeding sugar-bearing material to the water adjacent said outflow, translating mechanically the material within the said flow and across said region in countercurrent relation to the flow, and mechanically removing the material from the water adjacent said inlet.

2. The method of sugar diffusion which consists of maintaining a continuous gravity-induced flow of water unidirectionally within a confining passage having alternate downward and upward courses terminating in wells open to atmosphere flanking intermediate columns closed to atmosphere and characterized by a gaseous zone rather than a liquid zone common to their upper ends, maintaining a condition of reduced pressure in said gaseous zone, continuously introducing sugar-bearing material to said flow at the open water outflow end of the passage, mechanically translating said material continuously along the passage to the open water inlet end thereof in countercurrent relation to the flow, and mechanically removing said material from the water at said open water inlet end of the passage.

3. The method of sugar diffusion which consists of maintaining a continuous gravity-induced flow of water unidirectionally within a confining passage having alternate downward and upward courses terminating in water inlet and water outlet zones open to atmosphere flanking an intermediate zone closed to atmosphere and characterized by a gaseous region above and in contact with the water flow therethrough, maintaining a condition of reduced pressure within the gaseous region of said intermediate zone, continuously introducing sugar-bearing material to said flow at the water outlet zone of the passage, mechanically translating said material continuously along the passage to the water inlet zone thereof in countercurrent relation to the flow, and mechanically removing said material from the water at said open water inlet zone of the passage.

4. The method of sugar diffusion which consists of maintaining a continuous gravity-induced flow of water unidirectionally within a confining passage having alternate downward and upward courses terminating in upwardly-directed water inlet and water outlet zones open to atmosphere flanking and rising above communication with an upwardly more extensive intermediate zone characterized by elevation of the flow passage and a gaseous region above and in contact with the water flow therethrough and closed to atmosphere by the presence of said flow, maintaining a condition of reduced pressure within the gaseous region of the upper portion of said intermediate zone for consequent elevation of water therein to a pressure balance throughout the passage promotive of sustained gravity-induced flow from the open water inlet zone to the open water outlet zone, continuously introducing sugar-bearing material to said flow at the water outlet zone of the passage, mechanically translating said material continuously along the passage to the water inlet zone thereof in countercurrent relation to the water flow, whereby to subject the combined countercurrent circulation to the influence of the reduced pressure characterizing the gaseous region of the intermediate zone of the passage, and mechanically removing the material from the water at the open water inlet zone of the passage.

5. In a method of sugar diffusion characterized by continuous mechanical translation of sugar-bearing material within and in countercurrent relation to a continuous, gravity-induced, confined, unidirectional flow of water, the novel steps of directing said water flow to pass through a gaseous zone rather than a liquid zone of reduced pressure closed to atmosphere between a water inlet zone and a water outlet zone open to atmosphere, continuously feeding the sugar-bearing material to the water flow at said outflow zone, and continuously mechanically removing material from the water at said inflow zone, whereby to subject the combined countercurrent circulation to the influence of the reduced pressure of the gaseous zone as an incident of progressively continuous, free-flowing, regulable operations.

References Cited in the file of this patent

UNITED STATES PATENTS

| | | |
|---|---|---|
| 706,669 | Kessler | Aug. 12, 1902 |
| 1,961,420 | Hildebrandt | June 5, 1934 |
| 2,183,837 | Hamilton et al. | Dec. 19, 1939 |
| 2,390,131 | Silver | Dec. 4, 1945 |
| 2,505,716 | Morton | Apr. 25, 1950 |
| 2,548,996 | Morton | Apr. 17, 1951 |
| 2,602,761 | Hildebrandt | July 8, 1952 |
| 2,698,818 | Staerkle | Jan. 4, 1955 |

FOREIGN PATENTS

| | | |
|---|---|---|
| 293,066 | Great Britain | June 25, 1928 |
| 445,293 | Great Britain | Apr. 6, 1936 |